May 9, 1961 W. B. GAINEY 2,983,052
EXAMINATION RECORDING AND CORRECTING DEVICE
Filed April 1, 1960 2 Sheets-Sheet 1
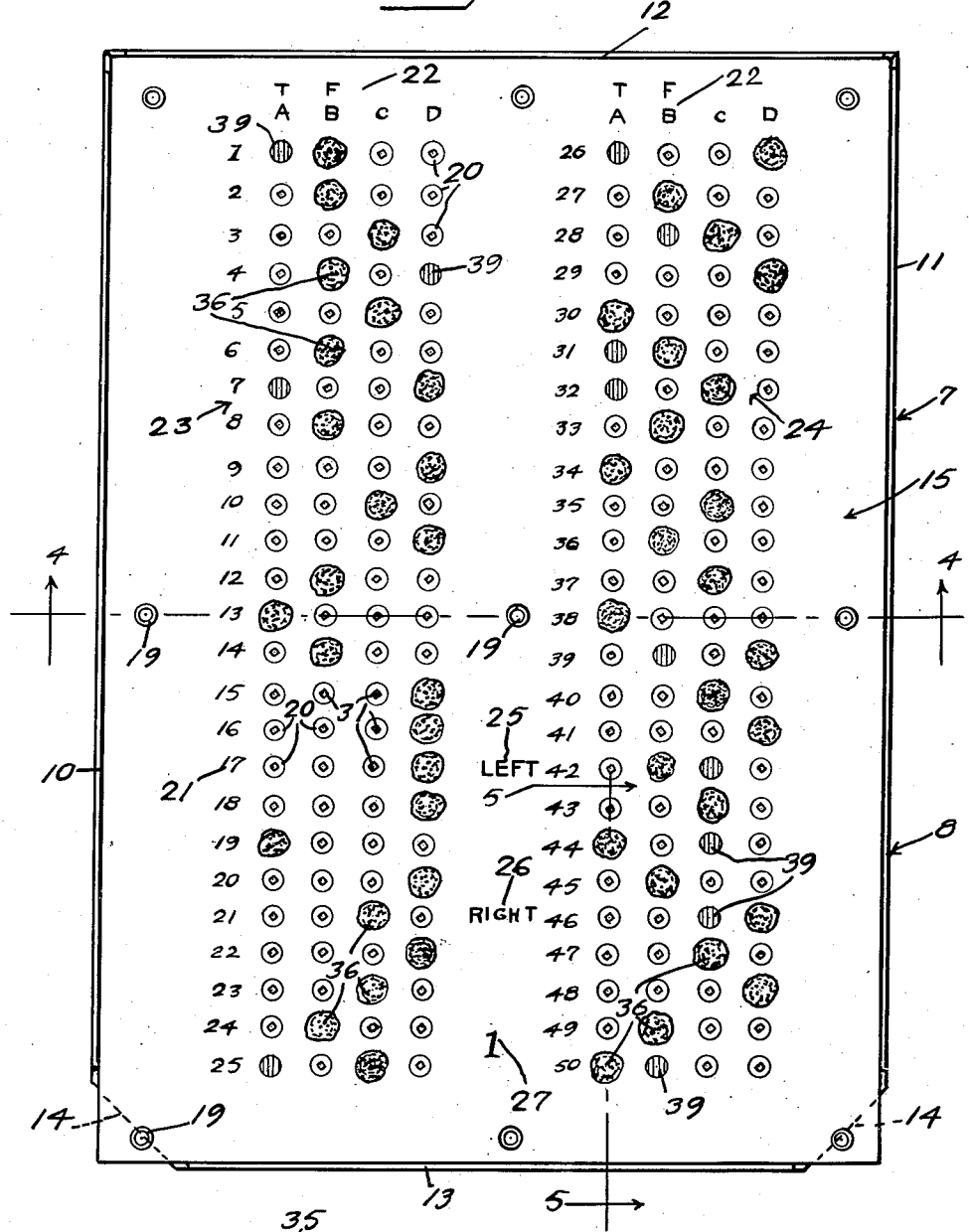
INVENTOR.
W.B. GAINEY
BY John H. Randolph
atty.

May 9, 1961   W. B. GAINEY   2,983,052
EXAMINATION RECORDING AND CORRECTING DEVICE
Filed April 1, 1960   2 Sheets-Sheet 2
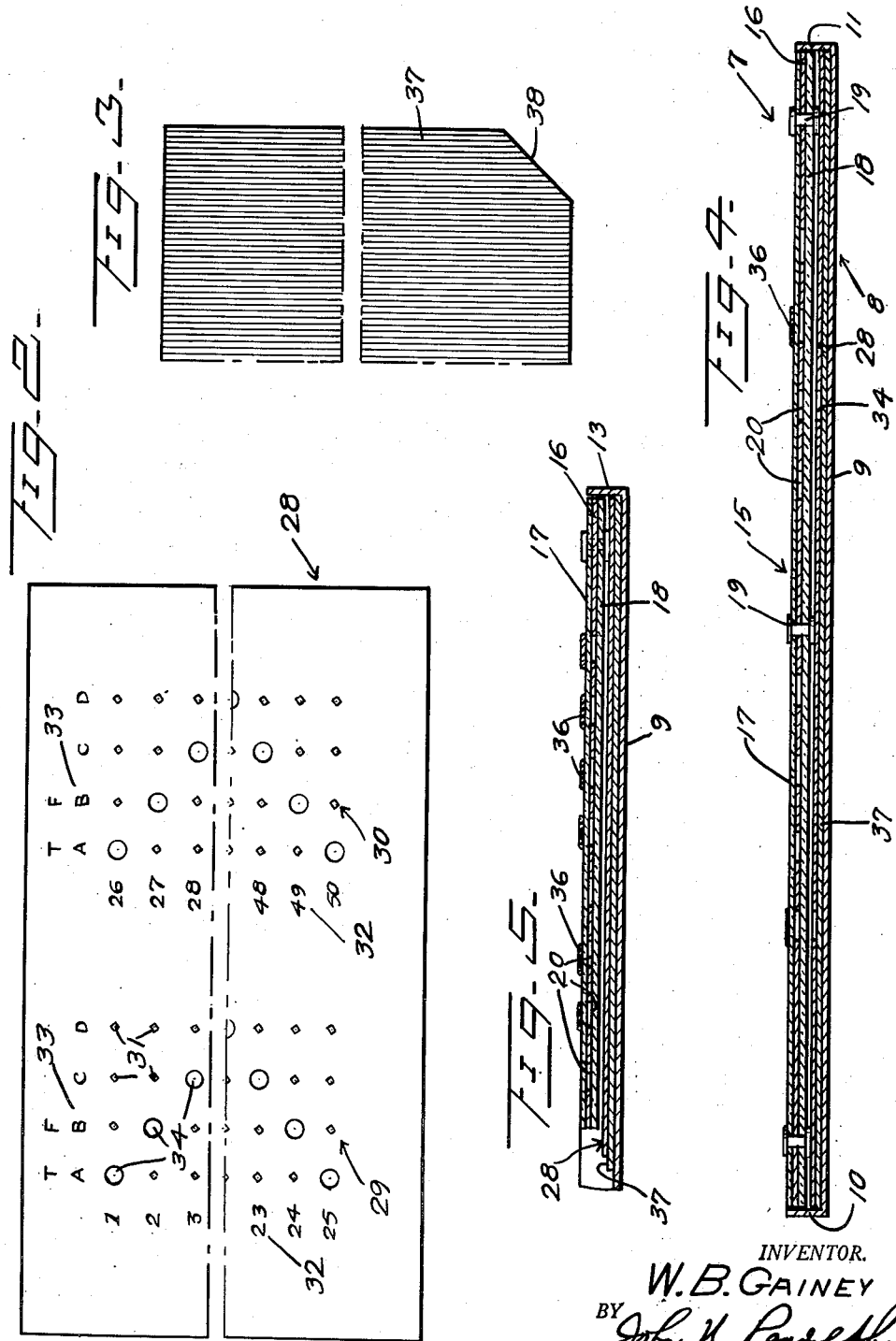
INVENTOR.
W. B. GAINEY

United States Patent Office 2,983,052
Patented May 9, 1961

2,983,052
EXAMINATION RECORDING AND CORRECTING DEVICE
Walter B. Gainey, 1421 N. 7th St., Terre Haute, Ind.
Filed Apr. 1, 1960, Ser. No. 19,372
4 Claims. (Cl. 35—9)

This invention relates to a device for use in schools and colleges or other educational institutions for conducting examinations of the "true or false" or "multiple choice" type, and has for its primary object to provide a device which will greatly facilitate the accurate grading of examinations and which will also enable examinations to be graded much more rapidly than would otherwise be possible.

Another important object of the present invention is to provide a device which may be utilized to permit the students to grade their own examinations and to enable the student to determine not only the questions which were answered incorrectly but also the correct answers for incorrectly answered questions, and which is accomplished immediately after the examination and while the questions are still fresh in the student's mind.

A further object of the invention is to provide a device of the aforementioned character including an examination recording card which may be used over and over in combination with different correction sheets prepared for the correct answers of a particular examination, to reduce to a minimum the expense involved in conducting examinations.

Still a further object of the invention is to provide an examination recording and correcting device by means of which the student may change his answers to questions, while the examination is being conducted, but which will prevent changing from an incorrect to a correct answer to a question, during correction of the examination by the student with a correction sheet.

Various other objects and advantages of the invention will hereinafter become more fully apparent from the following description of the drawings, illustrating a presently preferred embodiment thereof, and wherein:

Figure 1 is a plan view of the examination recording and correcting device, showing the parts assembled for correcting an examination card, after completion of the examination;

Figure 2 is a fragmentary top plan view of the correction sheet;

Figure 3 is a fragmentary plan view showing portions of a background sheet;

Figure 4 is an enlarged transverse sectional view taken substantially along a plane as indicated by the line 4—4 of Figure 1;

Figure 5 is an enlarged fragmentary longitudinal sectional view, taken substantially along a plane as indicated by the line 5—5 of Figure 1, and Figure 6 is a plan view of a scribing or marking instrument of the device.

Referring more specifically to the drawings, the examination recording and correcting device in its entirety is designated generally 7 and includes a rectangular holder, designated generally 8, composed of a lightweight rigid sheet material including a substantially flat bottom 9, upstanding side walls or flanges 10 and 11, and upstanding end walls or flanges 12 and 13. Said flanges or walls 10–13 are disposed perpendicular to the bottom 9 and extend upwardly only a short distance therefrom, as seen in Figures 4 and 5, so that the holder 8 provides a shallow tray. The end wall 12 constitutes the upper end of the holder 8 and the end wall 13 the lower end thereof. The bottom 9 has cutaway bottom corners 14, as seen in Figure 1, and the bottom wall 13 and the adjacent ends of the walls 10 and 11 terminate adjacent said cutaway or diagonal corners 14, for a purpose which will hereinafter be described.

The device 7 also includes an examination recording or taking card, designated generally 15, and which is preferably composed of a sheet of paper 16 interposed between transparent sheets 17 and 18 and which may be secured together, as by means of rivets 19, for retaining the sheet 16 between said transparent sheets 17 and 18. The sheets 17 and 18 are sufficiently stiff so that the card 15 is substantially rigid.

The upper face or side of the sheet 16, which is visible through the upper transparent sheet 17, is divided into two longitudinal or vertical columns each having twenty-five horizontal rows of openings 20, with four openings in each row of each column. The openings 20 of the different rows of both columns are numbered consecutively, as seen at 21, the rows in the first or left hand column being numbered from "1" to "25" and those of the other right hand column being numbered from "26" to "50." The vertical or longitudinal row of openings 20 of each of the two columns are also designated by letters, as seen at 22. The left hand vertical row of openings of each column is designated by the letter "T" and the letter "A," the next vertical row of openings 20 of each column are each designated by the letters "F" and "B," the third longitudinal row of each column is designated by the letter "C" and the fourth longitudinal row of each column is designated by the letter "D." Between the left column 23 and the right column 24, the sheet 16 bears the legend 25 reading "left" and the legend 26 reading "right" and the sheet also contains a large numeral "1," as seen at 27, which constitutes the number of the recording card 15.

The device 7 also includes a correction sheet, designated generally 28, of the same size as the sheet 16 and which has two columns 29 and 30, similar to the columns 23 and 24 except that instead of the openings 20, markings 31, such as small diamonds are provided. The horizontal rows of the columns 29 and 30 are numbered as seen at 32 in the same manner as the openings 20 of the sheet 16 are numbered as indicated at 21, and the vertical rows of markings 31 are designated by letters as indicated at 33, corresponding to the lettering 22 of the sheet 16. Any suitable punching machine, not shown, may be utilized for punching out one marking 31 of each row 32 of each column 29 and 30, to indicate a correct answer to a question and said punched out openings 34 can thus assume any arrangement in each column 29 and 30 and are of the same size as the openings 20.

For the purpose of conducting an examination, as many as fifty numbered questions can be prepared of either of the "true or false" or "multiple choice" type. Each student is given one of the cards 15 and a scribing instrument or pencil 35, and the questions are made available to each student. The scribing instrument or pencil 35 is capable of making an opaque blotch 36 on the exposed face of the upper transparent sheet 17 for covering and concealing selected ones of the openings 20. In this manner, and as illustrated in Figure 1, the student can indicate his answers on his card 15. After the examination has been completed the cards 15 can be graded either by the instructor or by the students. If the cards are to be graded by the students the pencils 35 are collected and each student is issued a correct answer sheet 28, a holder 7 and a backing sheet 37. The backing sheet 37 is of a distinctive color, preferably red, and is of the same size as the sheet 28 and card 15, except that it has cutaway corners 38 at one end. The backing sheet 37 is placed in the holder 7 with the corners 38 registering with the cutout corners 14 of the holder. The correct answer sheet is then placed face up on the background sheet 37 and the card 15 is applied over the correct answer sheet 28 and is held in registration therewith by the holder 7 since the sheet 28 and card 15 both fit snugly in said holder. Accordingly, the markings 31 and openings 34 of the correct answer sheet 28 will be disposed in registration with the openings 20 of the card 15, as seen in Figure 1. Where the coatings or blotches 36 are correctly applied the openings 34 will be covered; however, where said blotches 36 are incorrectly applied a red disc 39 will appear through the aligned openings 20 and 34 to indicate an incorrect answer. Since the student no longer has the pencil 35, a change cannot be made on the card 15 to cover the exposed colored disc 39. Thus, the student will know immediately the number of questions answered correctly, the questions answered incorrectly, and the correct answers for the incorrectly answered questions.

If desired, the cards 15 can be collected and graded in the aforedescribed manner by the instructor using a holder 7, background sheet 37 and correct answer sheet 28, and it will be readily obvious that the cards 15 can be quickly and accurately graded in this manner. The instructor using a pencil 35 can place numerals above or below the legends 25 and 26 indicating the number of incorrect answers in the columns 23 and 24, respectively. The corners of the cards 15 which extend beyond the corners 14 of the holder 7 are convenient to be engaged by the fingers for applying the cards 15 to the holder 7 and for removing said cards therefrom.

The numerals 27 of the cards 15 are used to identify the students, as the cards 15 can be issued in accordance with a numerical classification of the students and so that the grades on the cards can be correctly credited to the students. The blotches or coatings 36 may be readily removed with a rag or tissue paper, so that the cards 15 can be used indefinitely by merely producing new correct answer sheets 28 for each examination.

If desired, the sheet 16 may be merely provided with a transparent coating on both sides thereof instead of being disposed between the transparent plies 17 and 18 and the upper surface of the bottom 9 may be provided with a coating of a distinctive color, such as red, so that the background sheet 37 can be omitted.

Various other modifications and changes are likewise contemplated and may be resorted to, without departing from the function or scope of the invention as hereinafter defined by the appended claims.

I claim as my invention:

1. An examination recording and correcting device comprising an examination recording card including an opaque sheet provided with a plurality of openings arranged in horizontal and vertical rows, one side of said sheet containing indicia designating the openings of the horizontal and vertical rows, a transparent film constituting a part of the card and covering said indicia bearing side of the sheet, a scribing element for applying readily removable opaque blotches or spots to said film for covering and obscuring selected openings of the sheet, a distinctively colored background member underlying said card, and an opaque correct answer sheet interposed between said background member and card and having openings disposed to register with certain of the openings of the card for exposing a part of the background member through the registering openings of the card and sheet only when said registering openings are not obscured by an opaque blotch or spot whereby each portion of the background member exposed through two of the registering openings will constitute a distinctively colored spot indicating a correct answer of an incorrectly answered question.

2. An examination recording and correcting device as in claim 1, and a holder detachably receiving and retaining said correct answer sheet and card in correct registration with one another whereby all of the openings of the correct answer sheet will align with openings of the sheet forming a part of said card, said background member constituting a part of the holder.

3. An examination recording and correcting device as in claim 1, said film comprising a substantially rigid transparent sheet, a second substantially rigid transparent sheet forming a part of said card and between which transparent sheets said indicia bearing sheet is interposed, and means securing the transparent sheets and said indicia bearing sheet together for confining the indicia bearing sheet between the transparent sheets.

4. An examination recording and correcting device comprising an examination recording card including an opaque sheet provided with a plurality of openings arranged in horizontal and vertical rows, one side of said sheet containing indicia designating the openings of the horizontal and vertical rows, a transparent film constituting a part of said card and covering said indicia bearing side of the sheet, a scribing element for applying readily removable opaque blotches or spots to said film for covering and obscuring selected openings of the sheet, and correct answer indicating means disposed behind said recording card and having spaced distinctively colored portions disposed to register with certain of the openings of the card, when said correct answer indicating means is oriented with said card, whereby said portions are visible through such openings when the openings are not obscured by an opaque blotch or spot so that each such exposed portion indicates the correct answer of an incorrectly answered question.

References Cited in the file of this patent
UNITED STATES PATENTS

| | | |
|---|---|---|
| 1,867,511 | Kinnaird | July 12, 1932 |
| 1,915,653 | Dutton | June 27, 1933 |
| 2,137,736 | Watkins | Nov. 22, 1938 |
| 2,551,083 | Angell | May 1, 1951 |
| 2,725,644 | Wade | Dec. 6, 1955 |